US011187132B2

(12) United States Patent
Wang et al.

(10) Patent No.: US 11,187,132 B2
(45) Date of Patent: *Nov. 30, 2021

(54) EXHAUST GAS AFTER-TREATMENT MIXING DEVICE

(71) Applicant: Tenneco (Suzhou) Emission System Co., LTD., Suzhou (CN)

(72) Inventors: Cong Wang, Suzhou (CN); Shuo Li, Suzhou (CN); Chunhu Lv, Suzhou (CN)

(73) Assignee: TENNECO (SUZHOU) EMISSION SYSTEM CO., LTD., Suzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/772,781

(22) PCT Filed: Jun. 27, 2018

(86) PCT No.: PCT/CN2018/092998
§ 371 (c)(1),
(2) Date: Jun. 13, 2020

(87) PCT Pub. No.: WO2019/114247
PCT Pub. Date: Jun. 20, 2019

(65) Prior Publication Data
US 2020/0332697 A1    Oct. 22, 2020

(30) Foreign Application Priority Data

Dec. 13, 2017    (CN) .......................... 201711328261.6

(51) Int. Cl.
*F01N 3/28*    (2006.01)
*B01F 5/04*    (2006.01)

(52) U.S. Cl.
CPC .... *F01N 3/2892* (2013.01); *B01D 2251/2067* (2013.01); *B01F 5/0451* (2013.01);
(Continued)

(58) Field of Classification Search
CPC ......... B01D 2251/2067; B01F 3/04049; B01F 5/0451; B01F 5/0473; B01F 5/0648;
(Continued)

(56) References Cited

U.S. PATENT DOCUMENTS 5,514,347 A    5/1996  Ohashi et al.
9,784,163 B2 *  10/2017  Noren, IV ............ B01F 5/0451
(Continued)

FOREIGN PATENT DOCUMENTS

CN    103827458 A    5/2014
CN    105156181 A    12/2015
(Continued)

*Primary Examiner* — Phutthiwat Wongwian
*Assistant Examiner* — Diem T Tran
(74) *Attorney, Agent, or Firm* — Cheng-Ju Chiang

(57) ABSTRACT

The present application discloses an exhaust after-treatment mixing device including a housing and a mixing assembly located within the housing. The mixing assembly includes a first space, a second space and a third space. A top portion of the first space and a top portion of the second space are both in communication with the third space. The mixing assembly is provided with a first raised portion protruding upwardly into the third space and a second raised portion located below the first raised portion. A fourth space is formed between the first raised portion and the second raised portion. As a result, the distance and time for urea evaporation are increased and the uniformity of gas flow mixing is also improved.

20 Claims, 8 Drawing Sheets

(52) U.S. Cl.
 CPC ...... *F01N 2240/20* (2013.01); *F01N 2610/02* (2013.01); *F01N 2610/08* (2013.01)

(58) Field of Classification Search
 CPC .... B01F 5/0688; F01N 13/08; F01N 2240/20; F01N 2610/02; F01N 2610/08; F01N 3/08; F01N 3/2892
 See application file for complete search history.

(56) References Cited

U.S. PATENT DOCUMENTS

| | | | |
|---|---|---|---|
| 10,179,315 B2 * | 1/2019 | Brandl | F01N 13/0097 |
| 10,704,448 B2 * | 7/2020 | Wang | F01N 3/206 |
| 2005/0210865 A1 | 9/2005 | Bolander et al. | |
| 2015/0110681 A1 * | 4/2015 | Ferront | F01N 3/2892 422/168 |
| 2016/0131007 A1 * | 5/2016 | Kauderer | F01N 13/0097 422/177 |
| 2016/0317986 A1 * | 11/2016 | Alano | F01N 3/021 |
| 2017/0089246 A1 * | 3/2017 | Greber | B01F 5/0473 |
| 2018/0066559 A1 | 3/2018 | Haverkamp et al. | |
| 2019/0201854 A1 | 7/2019 | Cvelbar | |
| 2019/0323402 A1 | 10/2019 | Tucker et al. | |
| 2020/0131974 A1 | 4/2020 | Wang et al. | |

FOREIGN PATENT DOCUMENTS

| | | |
|---|---|---|
| CN | 105587384 A | 5/2016 |
| CN | 106014560 A | 10/2016 |
| CN | 205714374 U | 11/2016 |
| CN | 206987928 U | 2/2018 |
| CN | 207598327 U | 7/2018 |
| DE | 102009036511 A1 | 2/2011 |
| DE | 102015103425 B3 | 5/2016 |
| FR | 2945576 A1 | 11/2010 |

* cited by examiner

EXHAUST GAS AFTER-TREATMENT MIXING DEVICE

CROSS-REFERENCE TO RELATED APPLICATION

This application is a 35 U.S.C. § 371 National Phase conversion of International (PCT) Patent Application No. PCT/CN2018/092998, filed on Jun. 27, 2018, which claims priority to a Chinese Patent Application No. 201711328261.6, filed on Dec. 13, 2017 with an invention title of "Exhaust Gas After-treatment Mixing Device", the entire content of which is incorporated herein by reference. The PCT International Patent Application was filed and published in Chinese.

TECHNICAL FIELD

This application relates to an exhaust gas after-treatment mixing device, which belongs to the technical field of engine exhaust gas after-treatment.

BACKGROUND

Studies have shown that the uniformity of ammonia distribution in the exhaust gas after-treatment system (such as Selective Catalytic Reduction system, SCR system) has a significant impact on the overall performance and durability of the system. If the ammonia distribution is not uniform, it will cause too much ammonia in the local area and easily cause ammonia leakage, while in other ammonia-thin areas, the conversion efficiency of nitrogen oxides (NOx) will be too low. The uneven distribution of ammonia over a long period of time will lead to uneven aging of the catalyst, which will affect the overall performance of the catalyst. In addition, the uneven distribution of urea droplets will cause the temperature of the local pipe wall or the mixed structure to be too low, forming crystals, and in severe cases, the exhaust pipe will be blocked, resulting in a decrease in engine power performance.

Therefore, it is necessary to provide a new type of exhaust gas after-treatment mixing device to solve the above technical problems.

SUMMARY

An object of the present application is to provide an exhaust gas after-treatment mixing device with robust anti-crystallization ability.

In order to achieve the above object, the present application adopts the following technical solution: an exhaust gas after-treatment mixing device including a housing and a mixing assembly located in the housing. The housing is provided with a first opening and a second opening below the first opening. The mixing assembly includes a first inlet and a second inlet which are in communication with the first opening, a first space located inside the first inlet, a second space located inside the second inlet, a third space between the first space and the second space, a first partition wall between the first inlet and the first space, a second partition wall between the second inlet and the second space, a first raised portion protruding upwardly into the third space and a second raised portion located below the first raised portion. The first partition wall is provided with a plurality of first openings communicating the first inlet and the first space. The second partition wall is provided with a plurality of second openings communicating the second inlet and the second space. A fourth space is formed between the first raised portion and the second raised portion. The first raised portion includes a first side and a second side, wherein the first side is provided with a plurality of first perforations communicating the third space and the fourth space, and the second side is provided with a plurality of second perforations communicating the third space and the fourth space. A top of the first space and a top of the second space are both in communication with the third space. The fourth space enters the second opening from two sides in a double swirling manner.

As a further improved technical solution of the present application, a top of the housing is provided with a mounting seat for mounting a urea injector to spray urea into the mixing assembly.

As a further improved technical solution of the present application, the mixing assembly is provided with a first curved wall fixed to the first partition wall. The first curved wall includes a first portion inside the first partition wall. The first space is located between the first portion and the first partition wall. A first swirling direction is defined between the first portion and the first partition wall.

As a further improved technical solution of the present application, the mixing assembly is provided with a second curved wall fixed to the second partition wall. The second curved wall includes a second portion inside the second partition wall. The second space is located between the second portion and the second partition wall. A second swirling direction is defined between the second portion and the second partition wall. The first swirling direction is one of a clockwise direction and a counterclockwise direction, and the second swirling direction is the other of the clockwise direction and the counterclockwise direction.

As a further improved technical solution of the present application, the first curved wall further includes a first extension portion which extends inversely from the first portion. The first extension portion is directly or indirectly fixed to an inner wall of the housing so that the first inlet is sealed here. The second curved wall further includes a second extension portion which extends inversely from the second portion. The second extension portion is directly or indirectly fixed to the inner wall of the housing so that the second inlet is sealed here.

As a further improved technical solution of the present application, the fourth space further extends to a space between the first extension portion and the second raised portion, and to a space between the second extension portion and the second raised portion.

As a further improved technical solution of the present application, the fourth space further defines a third swirling direction and a fourth swirling direction. The third swirling direction and the second swirling direction are substantially the same, and the fourth swirling direction and the first swirling direction are substantially the same.

As a further improved technical solution of the present application, the first raised portion includes a first top side connecting the first side and the second side. The second raised portion includes a third side, a fourth side opposite to the third side and a second top side connecting the third side and the fourth side. An angle between the first side and the second side is an acute angle, and an angle between the third side and the fourth side is an acute angle.

As a further improved technical solution of the present application, the first side is fixed to the first curved wall, and the second side is fixed to the second curved wall.

As a further improved technical solution of the present application, the exhaust gas after-treatment mixing device further includes a baffle blocking the first space, the second space, the third space and the fourth space in order to force airflow enter from the first inlet and the second inlet.

As a further improved technical solution of the present application, the first opening is adapted for airflow to flow into, and the second opening is adapted for the airflow to flow out.

Compared with prior art, the present application forms a fourth space between the first raised portion and the second raised portion by providing the second raised portion. Under such design, it makes full use of the cross-section, increases the distance and time of urea evaporation, improves the uniformity of airflow mixing, and improves the anti-crystallization ability.

DETAILED DESCRIPTION

Figure 1:
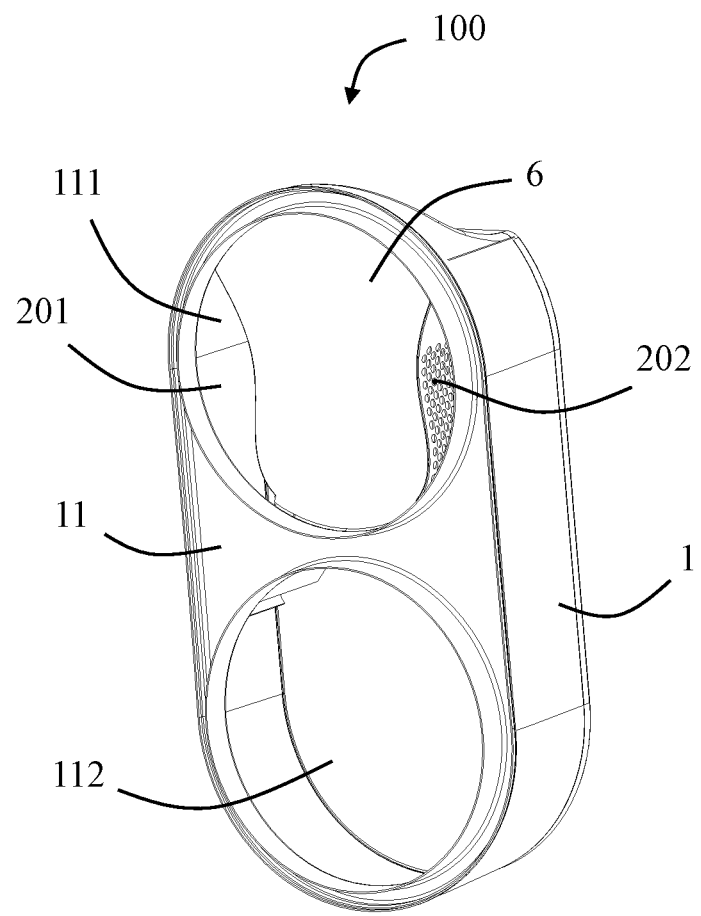
FIG. 1 is a schematic perspective view of an exhaust gas after-treatment mixing device of the present application.
Figure 2:
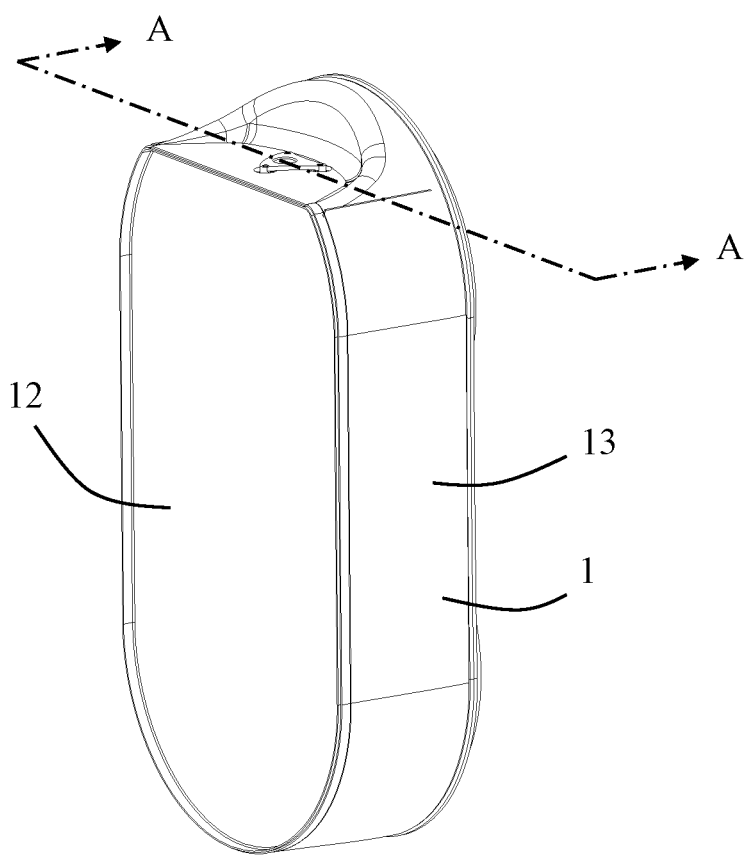
FIG. 2 is a schematic perspective view of FIG. 1 from another angle.
Figure 3:
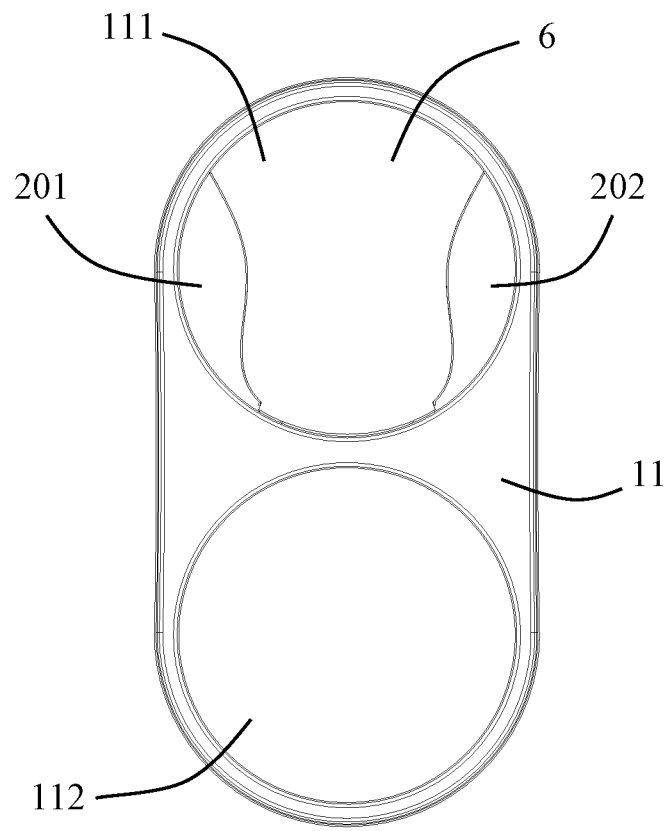
FIG. 3 is a front view of FIG. 1.
Figure 4:
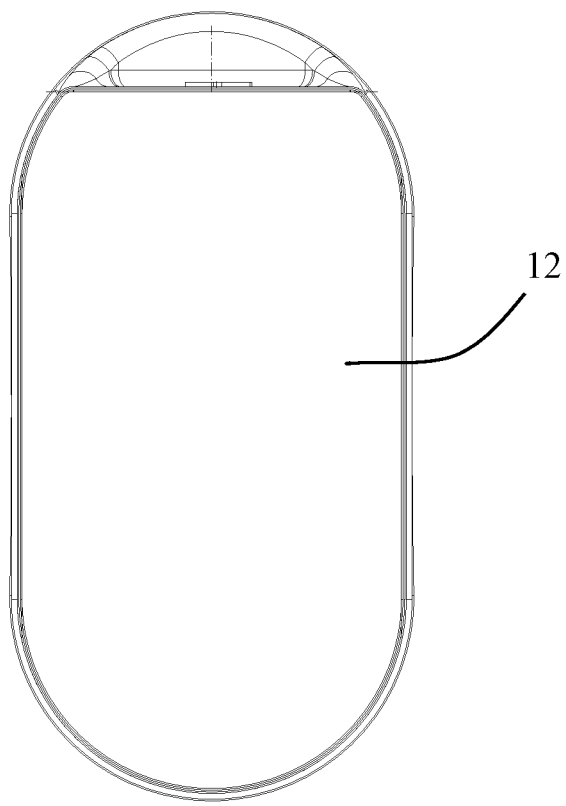
FIG. 4 is a rear view of FIG. 1.
Figure 5:
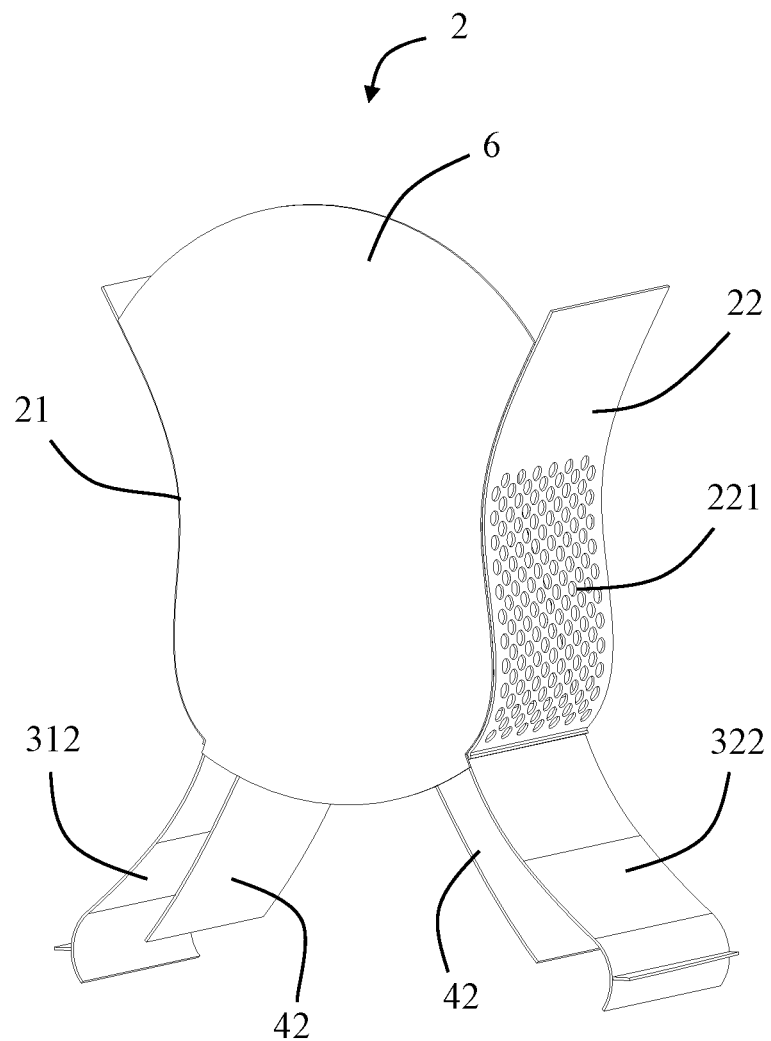
FIG. 5 is a schematic perspective view of FIG. 1 with the housing being removed.
Figure 6:
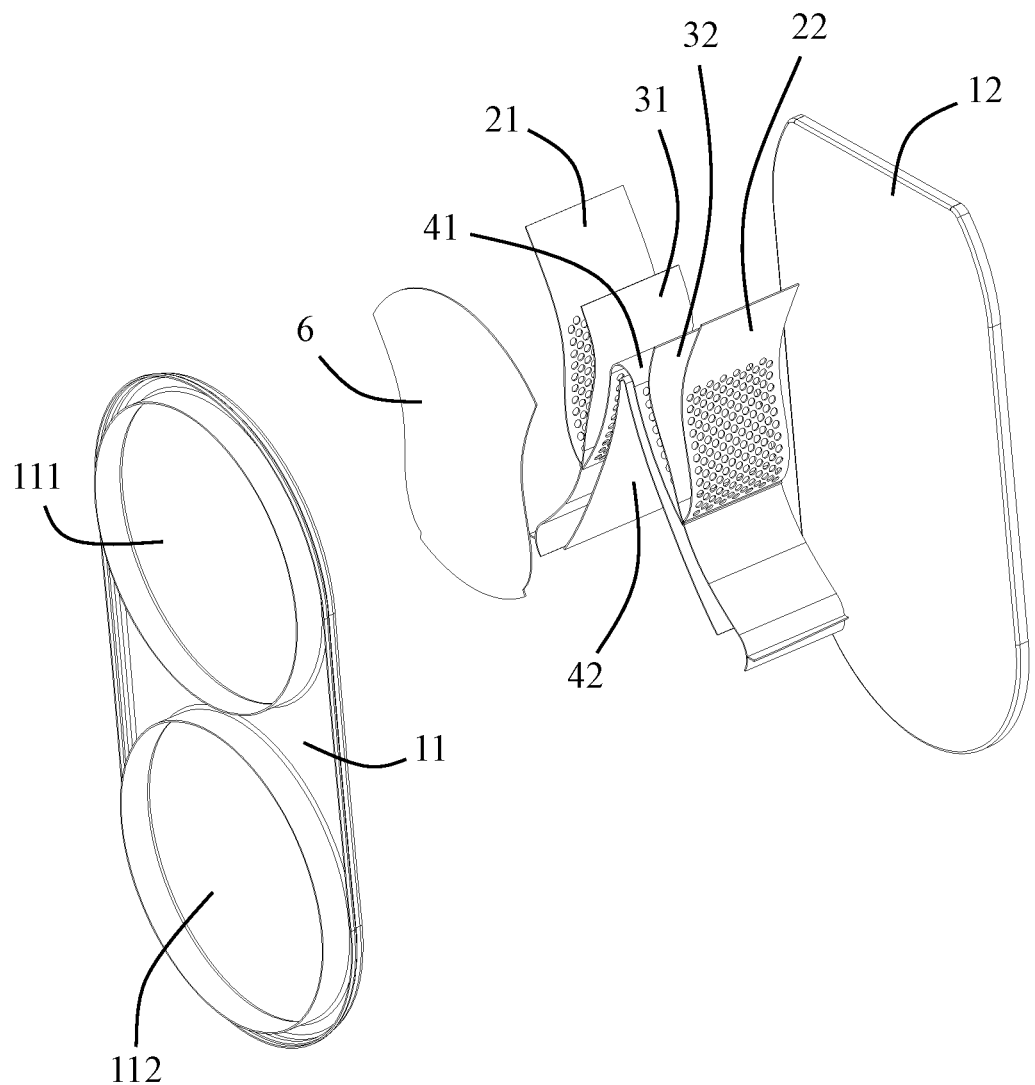
FIG. 6 is a partial exploded view of FIG. 1.
Figure 7:
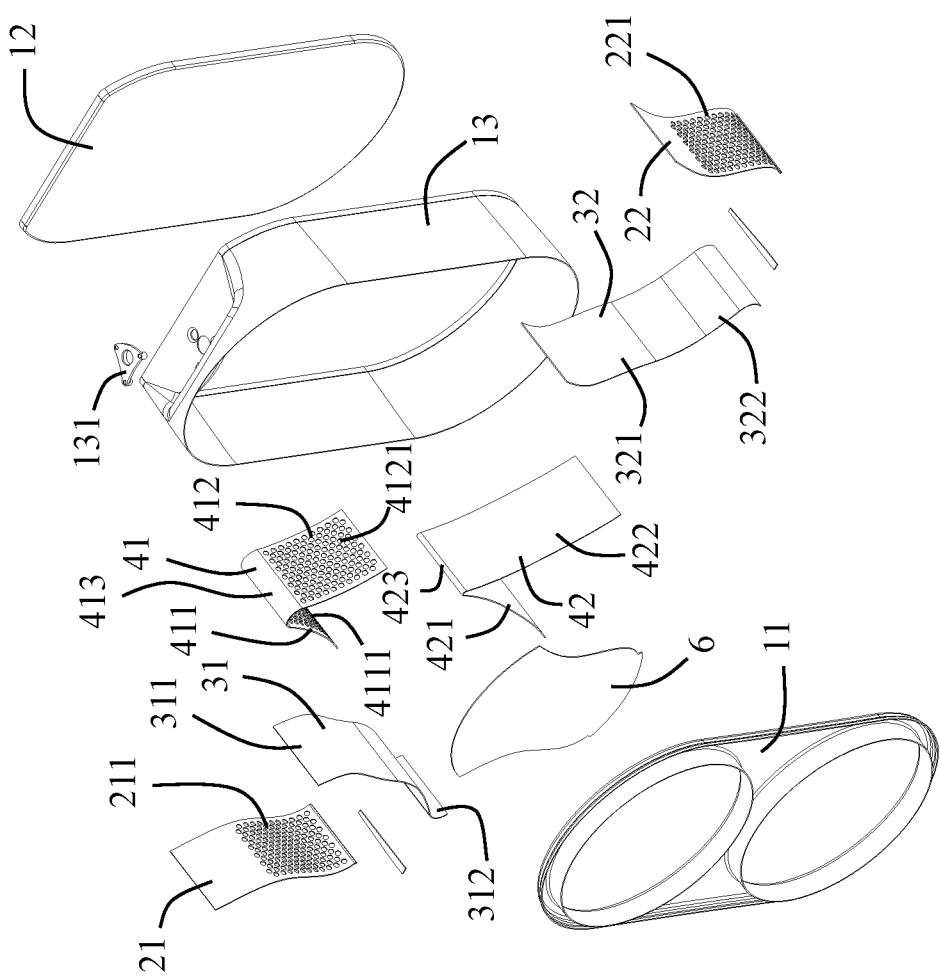
FIG. 7 is a further exploded perspective view of FIG. 6.

Referring to FIGS. 1 to 8, the present application discloses an exhaust gas after-treatment mixing device 100 which is used in an after-treatment system, such as SCR, to treat exhaust gas of an engine. The exhaust gas after-treatment mixing device 100 includes a housing 1 and a mixing assembly 2 installed in the housing 1.

In the illustrated embodiment of the present application, the housing 1 is provided with a first baffle 11, a second baffle 12 opposite to the first baffle 11, and an outer shell 13 surrounding the first baffle 11 and the second baffle 12. The first baffle 11 is provided with a first opening 111 and a second opening 112 located below the first opening 111. The first opening 111 is adapted for airflow (i.e., exhaust gas) to flow into the mixing assembly 2, and the second opening 112 is adapted for the airflow flow out of the mixing assembly 2. A mounting seat 131 is welded on a top of the housing 13. The mounting seat 131 is used to mount a urea injector (not shown) to spray urea into the mixing assembly 2.

The mixing assembly 2 includes a first inlet 201 and a second inlet 202 which are in communication with the first opening 111. Referring to FIGS. 5 to 8, from a structural point of view, the mixing assembly 2 includes a first partition wall 21 and a second partition wall 22 which are located at two sides of the first opening 111, a first curved wall 31 fixed to the first partition wall 21, a second curved wall 32 fixed to the second partition wall 22, a first raised portion 41 located inside the first curved wall 31 and fixed to the first and second curved walls 31, 32, and a second raised portion 42 located below the first raised portion 41.

In the illustrated embodiment of the present application, the first curved wall 31 includes a first portion 311 located inside the first partition wall 21 and a first extension portion 312 extending inversely from the first portion 311. The first extension portion 312 is directly or indirectly fixed to an inner wall of the housing 1 so that the first inlet 201 is sealed here. Similarly, the second curved wall 32 includes a second portion 321 located inside the second partition wall 22 and a second extension portion 322 extending inversely from the second portion 321. The second extension portion 322 is directly or indirectly fixed to an inner wall of the housing 1 so that the second inlet 202 is sealed here.

Figure 8:
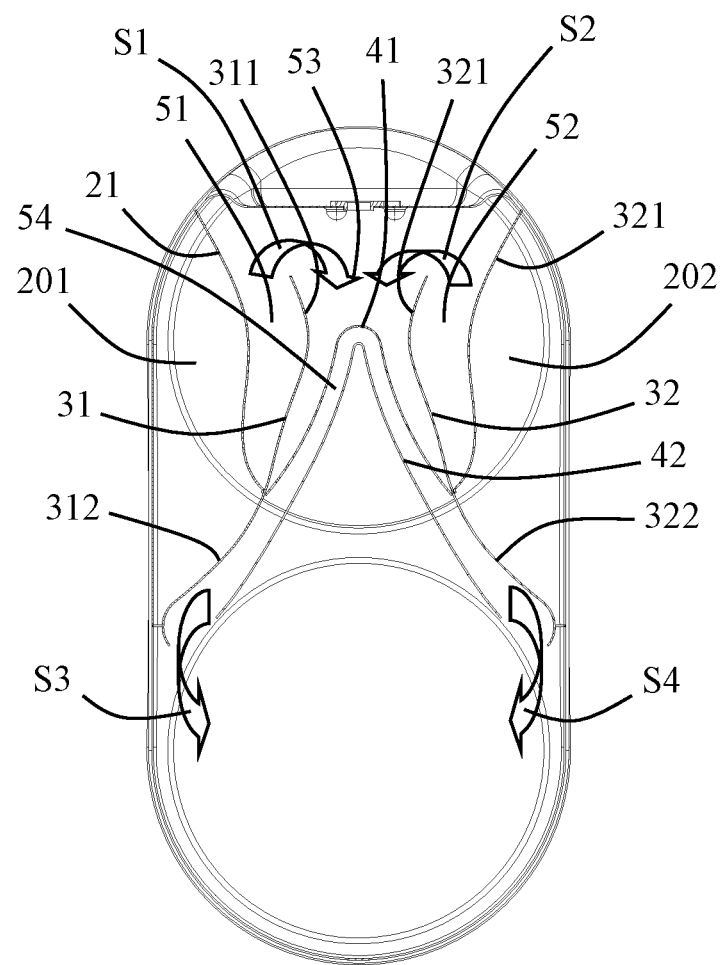
FIG. 8 is a schematic cross-sectional view taken along line A-A in FIG. 2 and indicating swirling directions of the airflow.

As shown in FIG. 8, the mixing assembly 2 includes a first space 51 between the first partition wall 21 and the first portion 311, a second space 52 between the second partition wall 22 and the second portion 321, a third space 53 between the first space 51 and the second space 52. The first space 51 is located inside the first inlet 201. The second space 52 is located inside the second inlet 202. The first raised portion 41 and the second raised portion 42 protrude upwardly into the third space 53. A fourth space 54 is formed between the first raised portion 41 and the second raised portion 42. The first partition wall 21 is provided with a plurality of first openings 211 communicating with the first inlet 201 and the first space 51. The second partition wall 22 is provided with a plurality of second openings 221 communicating with the second inlet 202 and the second space 52. A top of the first space 51 is communicated with the third space 53, and a top of the second space 52 is also communicated with the third space 53. A first swirling direction S1 is defined between the first portion 311 and the first partition wall 21. A second swirling direction S2 is defined between the second portion 321 and the second partition wall 22. The first swirling direction S1 is one of a clockwise direction and a counterclockwise direction, and the second swirling direction S2 is the other of the clockwise direction and the counterclockwise direction. Referring to hollow arrows in FIG. 8, in the illustrated embodiment of the present application, the first swirling direction S1 is a clockwise direction, and the second swirling direction S2 is a counterclockwise direction. In this way, a cross-section of the exhaust gas after-treatment mixing device 100 can be fully utilized to increase the mixing distance of urea and the exhaust gas in a double swirling manner, improve the uniformity of urea evaporation and mixing, and have strong anti-crystallization ability.

The first raised portion 41 is provided with a first side 411 and a second side 412. The first side 411 is provided with a plurality of first perforations 4111 communicating the third space 53 and the fourth space 54. The second side 412 is provided with a plurality of second perforations 4121 communicating the third space 53 and the fourth space 54. The fourth space 54 further extends between the first extension portion 312 and the second raised portion 42, and extends between the second extension portion 322 and the second raised portion 42. The fourth space 54 is communicated with the second opening 112 to form a double swirl flow. The fourth space 54 also defines a third swirling direction S3 and a fourth swirling direction S4, wherein the third swirling direction S3 is substantially the same as the second swirling direction S2, and the fourth swirling direction S4 is substantially the same as the first swirling direction S1.

The first raised portion 41 includes a first top side 413 which connects the first side 411 and the second side 412. The second raised portion 42 includes a third side 421, a fourth side 422 opposite to the third side 421, and a second top side 423 which connects the third side 421 and the fourth side 422. An angle between the first side 411 and the second side 412 is an acute angle, and an angle between the third side 421 and the fourth side 422 is an acute angle.

The first side 411 is fixed to the first curved wall 31, and the second side 412 is fixed to the second curved wall 32.

The exhaust gas after-treatment mixing device 100 further includes a baffle 6 that blocks the first space 51, the second space 52, the third space 53 and the fourth space 54, in order to force airflow enter from the first inlet 201 and the second inlet 202.

During use, when the exhaust gas of the engine enters the exhaust gas after-treatment mixing device 100, the exhaust gas enters the housing 1 from the first and second inlets 201, 202 due to the blocking of the baffle 6. The exhaust gas enters the first space 51 and the second space 52 through the first opening 211 and the second opening 221, respectively. Then, the exhaust gas rotates into the third space 53 from two sides along the first swirling direction S1 and the second swirling direction S2. When injecting conditions are met, the urea injector sprays urea into the third space 53, the atomized urea droplets are mixed with the exhaust gas and enter the fourth space 54 passing through the first and the second perforations 4111, 4121. As shown in FIG. 8, mixture of the urea droplets and the exhaust gas enters the second opening 112 along the third swirling direction S3 and the fourth swirling direction S4 in a double swirling manner.

It should be noted that the orientations of "upper", "lower", "top", "bottom" and the like described in the present application should not be limitedly understood, because these positional relationships should also be carried out according to the placement of the components. Adaptive understanding. In addition, the above embodiments are only used to illustrate the present application and not to limit the technical solutions described in the present application. The understanding of this specification should be based on those skilled in the art, although the present application has been carried out with reference to the above-mentioned embodiments in the detailed description, however, those of ordinary skill in the art should understand that those skilled in the art can still modify or equivalently replace the present application, and all technical solutions and improvements without departing from the spirit and scope of the present application should be within the scope of the claims of the present application.

What is claimed is:

1. An exhaust gas after-treatment mixing device comprising:
    a housing provided with a first opening and a second opening below the first opening; and
    a mixing assembly located in the housing, the mixing assembly comprising:
        a first inlet and a second inlet which are in communication with the first opening;
        a first space located inside the first inlet;
        a second space located inside the second inlet;
        a third space between the first space and the second space;
        a first partition wall between the first inlet and the first space, the first partition wall being provided with a plurality of first openings communicating the first inlet and the first space;
        a second partition wall between the second inlet and the second space, the second partition wall being provided with a plurality of second openings communicating the second inlet and the second space;
        a first raised portion protruding upwardly into the third space; and
        a second raised portion located below the first raised portion so that a fourth space is formed between the first raised portion and the second raised portion; wherein
        the first raised portion comprises a first side and a second side, the first side is provided with a plurality of first perforations communicating the third space and the fourth space, and the second side is provided with a plurality of second perforations communicating the third space and the fourth space; wherein
        a top of the first space and a top of the second space are both in communication with the third space; and wherein
        the fourth space enters the second opening from two sides in a double swirling manner.

2. The exhaust gas after-treatment mixing device according to claim 1, wherein a top of the housing is provided with a mounting seat for mounting a urea injector to spray urea into the mixing assembly.

3. The exhaust gas after-treatment mixing device according to claim 1, wherein the mixing assembly is provided with a first curved wall fixed to the first partition wall, the first curved wall comprising a first portion inside the first partition wall, the first space being located between the first portion and the first partition wall; a first swirling direction being defined between the first portion and the first partition wall.

4. The exhaust gas after-treatment mixing device according to claim 3, wherein the mixing assembly is provided with a second curved wall fixed to the second partition wall, the second curved wall comprising a second portion inside the second partition wall, the second space being located between the second portion and the second partition wall; a second swirling direction being defined between the second portion and the second partition wall; wherein the first swirling direction is one of a clockwise direction and a counterclockwise direction, and the second swirling direction is the other of the clockwise direction and the counterclockwise direction.

5. The exhaust gas after-treatment mixing device according to claim 4, wherein the first curved wall further comprises a first extension portion which extends inversely from the first portion, the first extension portion being directly or indirectly fixed to an inner wall of the housing; and
    the second curved wall further comprises a second extension portion which extends inversely from the second portion, the second extension portion being directly or indirectly fixed to the inner wall of the housing.

6. The exhaust gas after-treatment mixing device according to claim 5, wherein the fourth space further extends to a space between the first extension portion and the second raised portion, and to a space between the second extension portion and the second raised portion.

7. The exhaust gas after-treatment mixing device according to claim 4, wherein the fourth space further defines a third swirling direction and a fourth swirling direction; and wherein the third swirling direction and the second swirling direction are the same, and the fourth swirling direction and the first swirling direction are the same.

8. The exhaust gas after-treatment mixing device according to claim 4, wherein the first raised portion comprises a first top side connecting the first side and the second side; the second raised portion comprises a third side, a fourth side opposite to the third side and a second top side connecting the third side and the fourth side; an angle between the first side and the second side is an acute angle, and an angle between the third side and the fourth side is an acute angle.

9. The exhaust gas after-treatment mixing device according to claim 8, wherein the first side is fixed to the first curved wall, and the second side is fixed to the second curved wall.

10. The exhaust gas after-treatment mixing device according to claim 1, further comprising a baffle blocking the first space, the second space, the third space and the fourth space in order to force airflow enter from the first inlet and the second inlet.

11. An exhaust gas after-treatment mixing device, comprising:
 a housing provided with a first opening through which airflow flows into the housing and a second opening through which the airflow flows out of the housing; and
 a mixing assembly located in the housing, the mixing assembly comprising:
  a first inlet and a second inlet which are in communication with the first opening;
  a first space located inside the first inlet;
  a second space located inside the second inlet;
  a third space between the first space and the second space;
  a first partition wall between the first inlet and the first space, the first partition wall being provided with a plurality of first openings communicating the first inlet and the first space;
  a second partition wall between the second inlet and the second space, the second partition wall being provided with a plurality of second openings communicating the second inlet and the second space;
  a first raised portion protruding upwardly into the third space; and
  a second raised portion located below the first raised portion so that a fourth space is formed between the first raised portion and the second raised portion; wherein
  the first raised portion comprises a first side and a second side, the first side is provided with a plurality of first perforations communicating the third space and the fourth space, and the second side is provided with a plurality of second perforations communicating the third space and the fourth space; wherein
  a top of the first space and a top of the second space are both in communication with the third space; and wherein
  the fourth space enters the second opening from two sides in a double swirling manner.

12. The exhaust gas after-treatment mixing device according to claim 11, wherein a top of the housing is provided with a mounting seat for mounting a urea injector to spray urea into the mixing assembly.

13. The exhaust gas after-treatment mixing device according to claim 11, wherein the mixing assembly is provided with a first curved wall fixed to the first partition wall, the first curved wall comprising a first portion inside the first partition wall, the first space being located between the first portion and the first partition wall; a first swirling direction being defined between the first portion and the first partition wall.

14. The exhaust gas after-treatment mixing device according to claim 13, wherein the mixing assembly is provided with a second curved wall fixed to the second partition wall, the second curved wall comprising a second portion inside the second partition wall, the second space being located between the second portion and the second partition wall; a second swirling direction being defined between the second portion and the second partition wall; wherein the first swirling direction is one of a clockwise direction and a counterclockwise direction, and the second swirling direction is the other of the clockwise direction and the counterclockwise direction.

15. The exhaust gas after-treatment mixing device according to claim 14, wherein the first curved wall further comprises a first extension portion which extends inversely from the first portion, the first extension portion being directly or indirectly fixed to an inner wall of the housing; and
 the second curved wall further comprises a second extension portion which extends inversely from the second portion, the second extension portion being directly or indirectly fixed to the inner wall of the housing.

16. The exhaust gas after-treatment mixing device according to claim 15, wherein the fourth space further extends to a space between the first extension portion and the second raised portion, and to a space between the second extension portion and the second raised portion.

17. The exhaust gas after-treatment mixing device according to claim 14, wherein the fourth space further defines a third swirling direction and a fourth swirling direction; and
 wherein the third swirling direction and the second swirling direction are the same, and the fourth swirling direction and the first swirling direction are the same.

18. The exhaust gas after-treatment mixing device according to claim 14, wherein the first raised portion comprises a first top side connecting the first side and the second side; the second raised portion comprises a third side, a fourth side opposite to the third side and a second top side connecting the third side and the fourth side; an angle between the first side and the second side is an acute angle, and an angle between the third side and the fourth side is an acute angle.

19. The exhaust gas after-treatment mixing device according to claim 18, wherein the first side is fixed to the first curved wall, and the second side is fixed to the second curved wall.

20. The exhaust gas after-treatment mixing device according to claim 11, further comprising a baffle blocking the first space, the second space, the third space and the fourth space in order to force the airflow enter from the first inlet and the second inlet.

* * * * *